Figure 8:
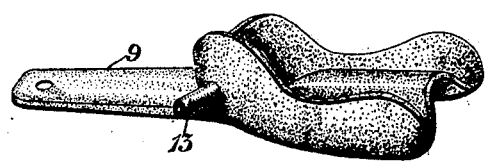

Nov. 10, 1925.
A. H. BROWN
1,561,052
METHOD OF MAKING DENTAL IMPRESSIONS
Filed Jan. 8, 1923    2 Sheets-Sheet 1
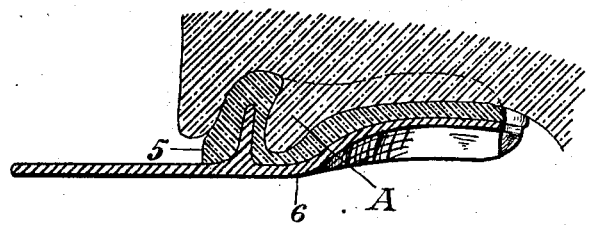
Fig.1.
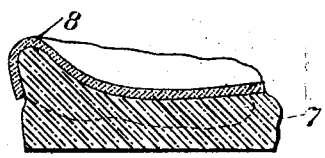
Fig.2.
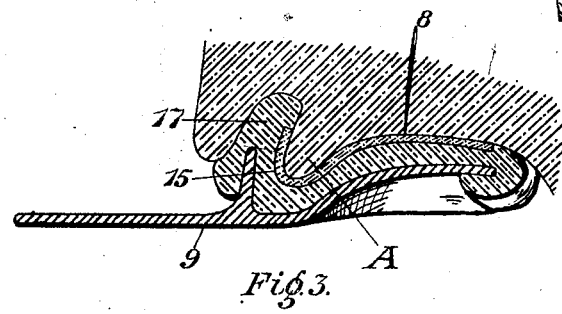
Fig.3.
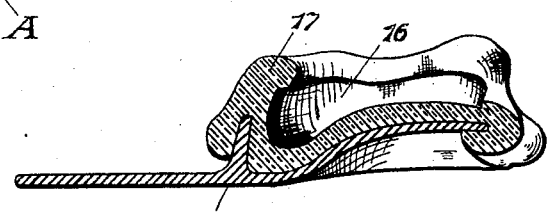
Fig.4.
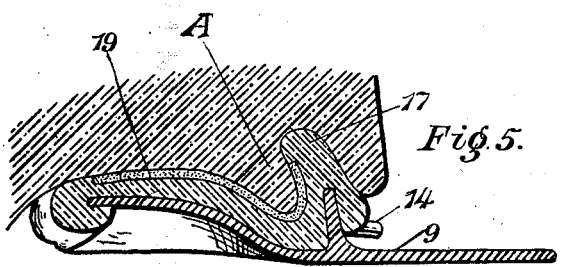
Fig.5.
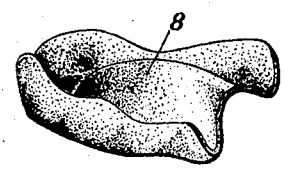
Fig.6.
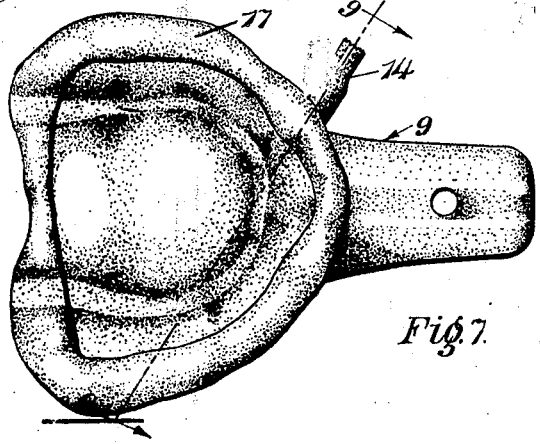
Fig.7.
INVENTOR.
A. H. Brown.
BY
ATTORNEY Nov. 10, 1925.  1,561,052
A. H. BROWN
METHOD OF MAKING DENTAL IMPRESSIONS
Filed Jan. 8, 1923   2 Sheets-Sheet 2

INVENTOR.
A. H. Brown
BY
ATTORNEY.

Patented Nov. 10, 1925.

1,561,052

UNITED STATES PATENT OFFICE.

ARTHUR H. BROWN, OF DENVER, COLORADO.

METHOD OF MAKING DENTAL IMPRESSIONS.

Application filed January 8, 1923. Serial No. 611,398.

*To all whom it may concern:*

Be it known that I, ARTHUR H. BROWN, a citizen of the United States, residing at Denver, in the county of Denver and State of Colorado, have invented certain new and useful Improvements in Methods of Making Dental Impressions, of which the following is a specification.

My invention relates to a method of producing impressions of the maxilla or mandible in the human mouth for use in the manufacture of artificial dentures and its primary object is to provide a simple and efficient method of subjecting a body of plastic material within a cavity formed around the portions of a mandible or maxilla to be fitted by the denture, to a uniformly distributed, preferably fluid, pressure whereby the material is brought evenly into contact with every part of the living tissues.

Another object of the invention resides in attaining the above described result by means of air under pressure, and still further objects reside in providing a simple process of producing a cavity in which the plastic material is confined and of subjecting the material in the cavity to the fluid pressure, and in the provision of simple and practical means for carrying the process into effect.

With the above and other objects in view, my invention consists in the process or method of operations fully set forth in the course of the following description with reference to the accompanying drawings in which like characters of reference designate corresponding parts through the several views.

Figure 15:
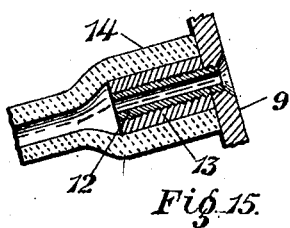
Figure 9:
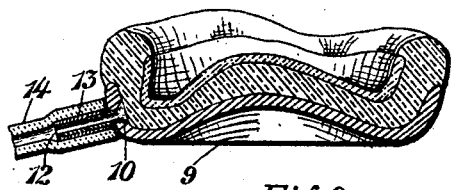
Figure 10:
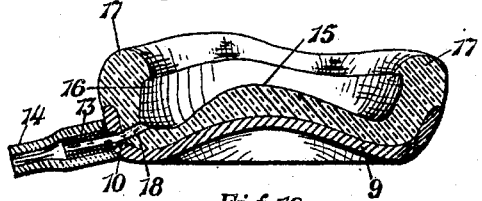
Figure 11:
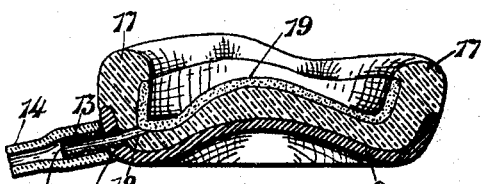
Figure 12:
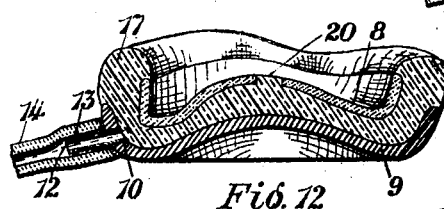
Figure 13:
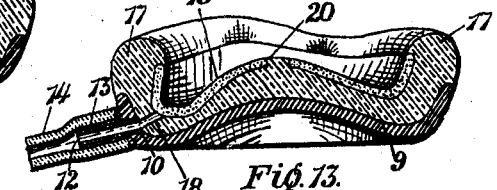
Figure 14:

In the drawings,

Figure 1 represents in sectional elevation, a dental tray filled with plaster, in its position relative to the maxilla in a human mouth to produce a snap impression which as will hereinafter be fully described, is the initial step of the process;

Figure 2, a section showing the manner of making a wax base upon a cast made from the impression;

Figure 3, a view similar to Figure 1 showing the method of producing in a modelling compound contained in a dental tray, a cavity conforming with the contour of the maxilla, by means of the base shown in Figure 2;

Figure 4, a sectional elevation of the dental tray and the modelling compound in which the cavity is formed, after the wax has been removed;

Figure 5, a section of the tray as shown in Figure 4, replaced in its operative relation to the maxilla after its cavity has been filled with a fluent substance such as plaster of Paris in water;

Figure 6, a perspective view of the wax base produced as shown in Figure 2;

Figure 7, a plan view of the tray and the modelling compound in which the cavity is formed as shown in Figure 4;

Figure 8, a perspective view of a dental tray of special construction used in the practice of the process;

Figure 9, a section taken on the plane indicated by the line 9—9 in Figure 7, illustrating the tray and its contents in the step of the process shown in Figure 3;

Figure 10, a section in the same plane conforming with the condition illustrated in Figure 4;

Figure 11, a similar section of the tray and its contents after the final impression has been made by a plastic substance in the cavity of the modelling compound, as shown in Figure 5;

Figures 12 and 13, sections in the same plane showing a modification in the method of forming the impression illustrated in Figure 11;

Figure 14, a perspective view of the tray and its modelling compound after the cavity has been formed therein, corresponding to the showing of Figures 3 and 10; and Figure 15, an enlarged fragmentary section of the means for connecting the interior of the tray shown in Figure 8, with a source of fluid under pressure.

In the following explanation of the different actions comprised in my process, I will for the sake of simplicity and clearness in description, refer only to the method of producing the impression from the maxilla in a human mouth, with the understanding that the process of obtaining an impression of the mandible is essentially the same, and that by the words maxilla and mandible is understood the upper and lower jaws and the living tissues forming the gums and palate, covering the same.

The principal feature of the invention resides in the production of a cavity around the tissues within a substantially air-tight closure, and another essential is to subject a fluent plastic substance in said cavity to exteriorly exerted pressure, preferably through the medium of compressed air.

To produce these results in as effective and practical a manner as is at present known to me, I perform the following actions in successive order by the employment of a suitable equipment, such as shown in the drawings.

The first step in the process of producing the cavity above referred to, consists in obtaining what is commonly known as a "snap" impression of the tissues on the maxilla by means of a plastic substance 5 contained in a dental tray 6 of conventional construction, as shown in Figure 1 of the drawings in which the maxilla has been designated by the letter A.

The impression after the substance has hardened, is employed to produce a cast 7 of similar material, which obviously is an exact reproduction of the portion of the maxilla of the patient, of which the impression was made.

Upon the cast is made a wax base 8 of a thickness corresponding to the required depth of the cavity. The base which in the process serves as an insert which forms the cavity in a modelling compound impression hereinafter to be described, is preferably formed by pressing two sheets of base plate wax upon the cast as illustrated in Figure 2 of the drawings.

In the following steps of the process, I employ a dental tray 9 of special construction, illustrated in Figure 8, which in its upstanding rim is provided with an aperture 10, the end of which at the inner surface of the same, is countersunk as best shown in Figure 9.

An externally threaded tube 12 is fastened in the aperture at one end to extend laterally from the rim of the tray, and a correspondingly threaded sleeve 13 is placed upon the tube to provide a convenient means for the connection of a rubber tube 14 which in the practice of the process, is employed to conduct a fluid under pressure to the cavity that is formed in the tray by means of the wax insert in the following manner.

The tray is filled with a modelling compound 15 and placed in the mouth of the patient after the wax base has been fitted upon the maxilla A of which it is a negative counterpart.

When the tray thus placed is pressed against the maxilla, the base enters into the compound, and the marginal portion of the latter is raised around the peripheral edge thereof in contact with the tissues, as illustrated in Figure 3.

After the tray has been taken from the mouth and the compound has been allowed to harden, the wax is removed with the result that a depression 16 corresponding with the contour of the gum and the palate is produced in the surface of the impression, surrounded by a wall 17 which when the tray is replaced, will snugly engage with the tissues around the portion of the maxilla to be fitted by the denture.

The compound in the tray is now cut or bored to provide a passage 18 which connects the depression with the opening 10 in which the tube 12 is fastened, and the depression or cavity is subsequently filled with plaster of Paris or other suitable substance in a fluent condition, as indicated at 19 in Figures 5 and 11.

The tray is now replaced in the mouth and held firmly in place on the maxilla so that the rim of the wall of the compound in which the cavity is formed fits snugly against the tissues and thereby closes the cavity at the peripheral edge thereof.

The tube connecting with the opening in the rim of the tray is connected with a source of fluid under pressure, preferably compressed air contained in a supply tank or produced by a pressure pump, hand bulb or other suitable expedient, and the fluid is admitted to the cavity in the tray to press upon the fluent contents thereof.

The pressure exterted on the plaster of Paris is uniformly distributed in all directions against the tissues thereby securing their compression without displacement or distortion.

The pressure is maintained until the plaster has hardened after which the tray is removed from the mouth and a cast is made of the impression over which the artificial denture is constructed.

It will be evident that in the process as hereinabove described, an impression of the surfaces of the tissues in the mouth of the patient is produced with a degree of accuracy and perfect conformity which can not possibly be attained by hand pressure such as is employed by dentists in the present mode of making impression for use in the production of artificial dentures, and that in consequence the operator is enabled to produce an artificial denture which is correctly adjusted and exactly fitted to the part to which it is applied.

It is advisable to close the countersunk opening in the tray, which connects with the source of fluid pressure, by means of a small piece of modelling compound before the plaster of Paris is flowed into the cavity, so as to prevent of it being clogged before the pressure is applied, it being apparent that the small plug is easily blown from the aperture and does not interfere with forming the impression as described.

It may also be expedient to provide an additional support for the tray by engagement with the roof of the mouth, by cutting an opening in the wax base or insert 8 which permits of the modelling compound passing to the upper surface thereof, as illustrated at 20 in Figures 12 and 13.

Other variations in the method of forming the cavity and applying the contents thereof to the parts under treatment may be resorted to within the spirit of my invention, it being readily apparent that for example, the formation of a snap impression, cast and wax base may be dispensed with and the cavity produced by hollowing the upper surface of an impression in a modelling compound in a tray of the required construction, by hand or by means of specially designed cutting tools. It will furthermore be understood that while a fluid pressure is most suitable to produce an even pressure over the entire extent of the fluent contents of the cavity in the tray, it is possible that a similar result be obtained by mechanical means.

What I claim and desire to secure by Letters Patent is:

1. In the manufacture of artificial dentures, the method of producing an impression of the surface of a maxilla or mandible to be fitted by the denture, consisting in making a snap impression of the surface, making a cast of said impression, forming a base over the cast, producing a second impression of the surface with the base in place thereon whereby to obtain a depression of a depth corresponding with the thickness of the base after the latter is removed, making a third impression of the surface in a plastic substance confined in the depression, and connecting the depression with a source of fluid under pressure.

2. In a process of producing artificial dentures, a dental tray having means for its connection with a source of fluid under pressure, and a hardened plastic substance in the tray having a wall adapted to marginally engage with a surface to which the tray is applied and having within the marginal portion of said wall, a depression conforming to said surface and connecting with said means.

3. In a process of producing artificial dentures, a dental tray having an aperture and in connection therewith, a tube for its connection with a source of fluid under pressure, and a hardened plastic substance in the tray having a wall adapted to marginally engage with a surface to which the tray is applied and having within the marginal portion of said wall, a depression conforming to said surface and provided with a passage from its interior surface to said aperture.

4. In the manufacture of artificial dentures, the method of making an impression of the gums, consisting in producing a wall around the portion of the gum from which the impression is to be taken, applying a plastic substance to the gum within said wall, and subjecting said substance to inwardly directed pressure.

5. In the manufacture of artificial dentures, the method of producing an impression of the surface of a maxilla or mandible to be fitted by the denture, consisting in subjecting a fluent plastic substance in a cavity of an impression made fluid-tight by contact with the tissues immediately around said surface, to fluid pressure.

6. In the manufacture of artificial dentures, the method of producing an impression of a portion of the surface of a maxilla or mandible, to be fitted by the denture, consisting in subjecting a fluent plastic substance within a cavity made fluid-tight by said surface, to fluid pressure.

7. In the manufacture of artificial dentures, the method of making an impression of the surface of a maxilla or mandible to be fitted by the denture, consisting in producing an impression having a cavity coextensive with said surface and surrounded by a wall adapted to engage the tissues around the surface, filling the cavity with a fluent plastic substance, and subjecting the substance in the cavity to fluid pressure.

8. In the manufacture of artificial dentures, the method of making an impression of the surface of a maxilla or mandible to be fitted by the denture, consisting in producing a walled cavity adapted to be made fluid-tight by engaging the tissues around said surface, filling the cavity with a fluent plastic substance, and subjecting the substance in the cavity to fluid pressure.

9. In a process of producing artificial dentures, a device adapted to imperviously engage a surface to which the tray is applied and having a walled cavity coextensive with a portion of said surface, and means for subjecting a substance in said cavity to fluid pressure.

In testimony whereof I have affixed by signature.

ARTHUR H. BROWN.